United States Patent [19]

Sarumaru

[11] Patent Number: 5,641,521
[45] Date of Patent: Jun. 24, 1997

[54] TIRE CONVEYOR UNIT FOR TIRE VULCANIZER EQUIPMENT

[75] Inventor: Shogo Sarumaru, Takasago, Japan

[73] Assignee: Kabushiki Kaisha Kobe Seiko Sho, Kobe, Japan

[21] Appl. No.: 566,155

[22] Filed: Dec. 1, 1995

[30] Foreign Application Priority Data

Dec. 5, 1994 [JP] Japan .................................. 6-330048

[51] Int. Cl.$^6$ .................................................. B29D 30/06
[52] U.S. Cl. ............................................................. 425/38
[58] Field of Search .................................. 425/36, 38, 193

[56] References Cited

U.S. PATENT DOCUMENTS

| | | | |
|---|---|---|---|
| 4,252,241 | 2/1981 | Trail | 425/38 |
| 4,279,438 | 7/1981 | Singh | 425/38 |
| 4,600,370 | 7/1986 | Kaneko et al. | 425/38 |
| 4,618,320 | 10/1986 | Singh | 425/38 |
| 4,725,212 | 2/1988 | Singh | 425/38 |
| 4,950,142 | 8/1990 | Katayama et al. | 425/38 |
| 5,441,393 | 8/1995 | Fujieda et al. | 425/58.1 |

FOREIGN PATENT DOCUMENTS

| | | |
|---|---|---|
| 1-113212 | 5/1989 | Japan . |
| 6-51295 | 7/1994 | Japan . |
| 6-246747 | 9/1994 | Japan . |

*Primary Examiner*—James P. Mackey
*Attorney, Agent, or Firm*—Oblon, Spivak, McClelland, Maier & Neustadt, P.C.

[57] ABSTRACT

A loader and an unloader include a tire grip whose height is adjustable by way of a link portion. The tire grip is mounted at the tip of a boom that freely swivels, freely moves up and down and faces molds. More specifically, in the link portion between the tire grip and the boom that moves up and down and swivels freely between the inner side and outer side of a tire vulcanizer, a screw structure is provided to screw an external thread member affixed to the boom into an internal thread formed at the end of the tire grip, and the height of the tire grip can therefore easily be adjusted by rotating the external thread member.

9 Claims, 3 Drawing Sheets

TIRE CONVEYOR UNIT FOR TIRE VULCANIZER EQUIPMENT

BACKGROUND OF THE INVENTION

1. Field Of The Invention

This invention relates to a loader and an unloader for a tire vulcanizer. Stated more specifically, this invention relates to a compact and economical loader for a tire vulcanizer for carrying in untreated tires to a mold with high precision, when there are two or more mold lines, and different sizes of untreated tires must be conveyed to the mold. This invention further relates to a compact and economical unloader for a tire vulcanizer for carrying out treated tires from the mold with high precision.

2. Description Of The Related Art

Carry-in or conveyance of untreated tires to a tire vulcanizer is generally performed for two mold lines on the left and right. Therefore, a system is generally utilized in which two units on the left and right simultaneously raise and lower a loader for carry-in of untreated tires from a supply unit to the vulcanizer mold, and an unloader for carry-out of the vulcanized tire from the vulcanizer mold. Further there are also cases where a mechanism is provided for adjusting the height of a tire grip in order to match the height of the untreated tires being supplied, in the event the tire sizes of the two lines differ. There is also tire vulcanizing equipment of a multi-system type utilizing numerous mold lines, not being limited to the above two mold line system, and provided with tire grip in each loader and unloader having a height adjusting mechanism.

The height adjusting mechanism on these types of tire grips (especially in the loader) utilized in conventional equipment are broadly classified into the following two types. One type provides a screw structure in the center of the tire grip, and when this screw is turned, the tire grip and boom rise and lower, relative to a frame (see Japanese Patent Publication No. HEI 6-51295). Another type of tire grip is mounted at the tip of a swivel boom capable of freely moving up and down, and has a screw structure provided in the swivel axis of the boom. By turning this screw to raise and lower the boom, the tire grip is made to raise and lower as an integral part of the boom (see Japanese Patent Publication No. SHO 46-24773).

However both these conventional devices have problems. The type with a direct screw structure provided in the center of the tire grip, does have the advantage that the center of the untreated tire can be made to fit with good precision in the center of the mold of the vulcanizer. However, in the initial molding (hereafter "shaping") of the tire, the tip of the center mechanism of a telescoping bladder must pass through a hole of limited dimensions from the lower center surface of the tire grip, from bottom to top. Unfortunately, since the previously mentioned screw structure is located at the center of the tire grip, this kind of center mechanism (telescoping bladder) is blocked and cannot pass through.

A plurality of tire grip paddles (hereafter "paddles"), located in the lower part of the tire grip and being expandable/contractible in the horizontal and radial direction of the equipment, has long legged structures, and they were utilized to form an extra empty space near the center of the lower side of the tire grip so that the shaping could be performed without damage. However, in order to maintain high precision for insertion in the center position of the mold, the strength of each paddle had to be increased according to the length of the long legged structure. This necessity caused the problem that the tire grip had to be made into a larger-scale unit.

On the other hand, in the type having the screw structure provided in the swivel axis of the boom, the tip of a mechanism of the bladder is designed to pierce a hole at the center of the bladder in the lower central surface of the tire grip. This type of tire grip is compact and capable of performing shaping without using the long legged tire grip paddles. However, unlike the conventional example first mentioned above, this type has poor precision because there is a considerable distance between the center of the tire grip and the swivel axis of the boom. Therefore only a slight error in the screw feed of the boom swivel axis is magnified according to the length of the boom at the center of the tire grip, finally causing an error too large to be ignored. This makes it difficult for the untreated tire center to be mounted on the mold center in the vulcanizer, making improvements in product precision unlikely.

Another method uses a direct-action hydraulic cylinder linked to the boom without using a screw structure for raising and lowering the boom as was done in the second conventional example. This method regulates raising and lowering of the boom by controlling a hydraulic cylinder operation with optional position settings by means of control mechanisms and distance sensors such as rotary encoders. However the structure of this method is not only overly complicated but impractical since the cost of the loader and unloader is too high. The above listed problems are not limited to a loader but also occur in an unloader.

SUMMARY OF THE INVENTION

It is therefore an object of this invention to provide a tire conveyor for tire vulcanizer that is both compact and economical, loads untreated tires from the tire grip with good precision into the vulcanizer mold, and which further does so without causing damage during shaping, even for different sizes of tires.

One preferred embodiment of this invention is a tire conveyor for a tire vulcanizer comprising a tire grip, a boom and a link portion provided between the boom and tire grip. The link portion of the tire conveyor for tire vulcanizer can adjust the position of the tire conveyor in the height direction. The boom is constructed so that it can swivel freely, and rise and lower freely relative to the mold. This conveyor may be a loader or an unloader.

DESCRIPTION OF THE PREFERRED EMBODIMENTS

Figure 1:
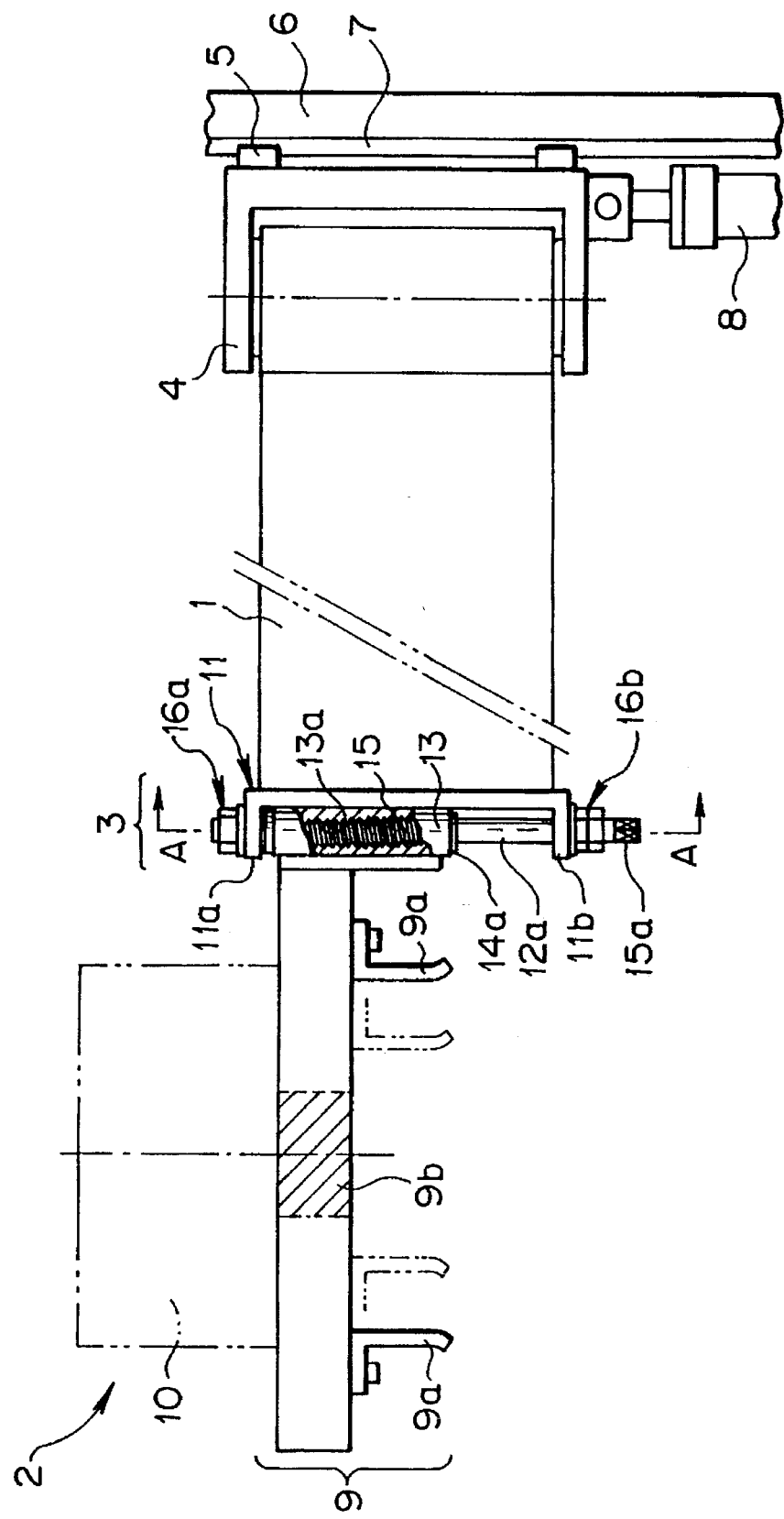
FIG. 1 is a cut-away cross sectional side view of a loader or an unloader of a first embodiment of this invention.
Figure 2:
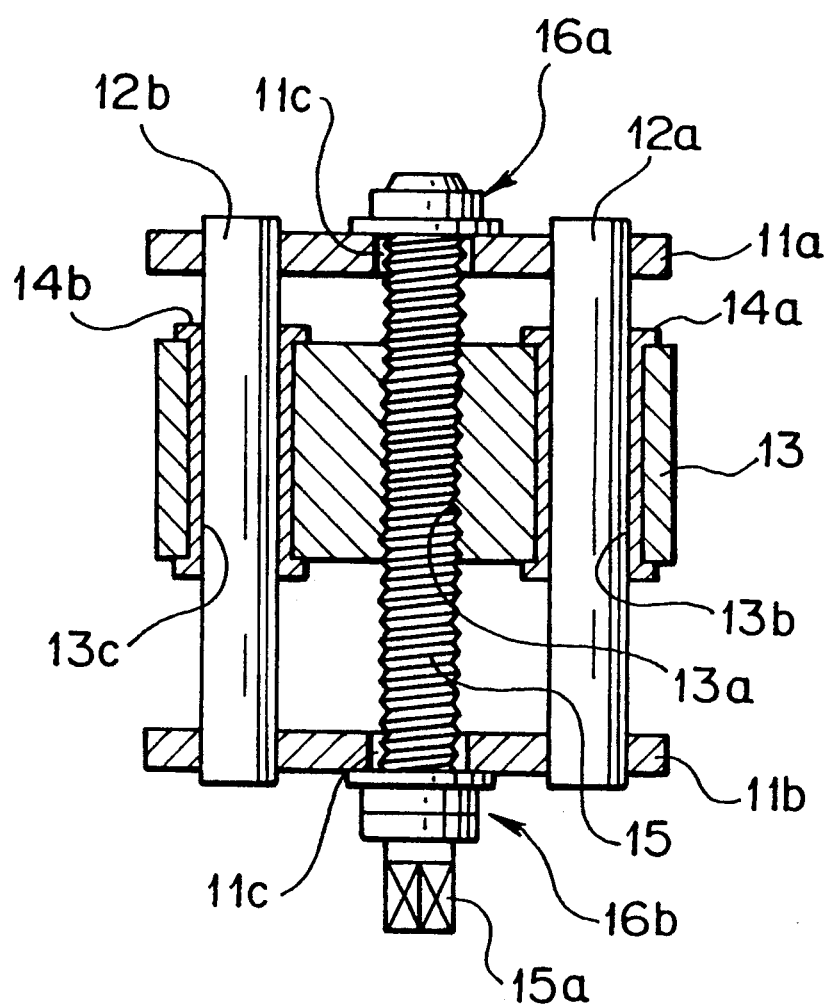
FIG. 2 is a cross sectional view taken along the line A—A of FIG. 1.

A first embodiment of this invention will now be explained while referring to the drawings. As shown in FIG. 1, the loader and the unloader for the tire vulcanizer comprises a boom 1, a tire grip 2 provided at a tip of this boom 1, and a link portion 3 for connecting the boom 1 and the tire grip 2. In FIGS. 1 and 2, only one boom 1 and tire grip 2 are shown, however in a tire vulcanizer having two mold lines; two booms 1 which freely swivel and freely move up and down are installed facing each mold, and a loader or an unloader is mounted with the tire grip 2 by means of the link portion 3 at the tip of each boom 1. In a multi-system type of tire vulcanizer, the above mentioned loader or unloader is provided for each of a plurality of molds.

The boom 1 is axially supported in a base 4 to allow swiveling. A plurality of sliders 5 are provided on one side of the base 4 for interactive sliding movement along a rail 7 affixed in a frame 6. A hydraulic cylinder 8 is installed at the bottom of the base 4. The action of this hydraulic cylinder 8 allows the boom 1 to move up and down along the rail 7.

The tire grip 2 has a transmission 10 (enclosed by a dot-dash line on the drawing) for opening and closing a grip paddle 9a of a tire grip body 9. A plurality of the expandable and contractible grip paddles 9a are installed horizontally and radially on the bottom of the tire grip body 9. A hole 9b (shown by a dashed line on the drawing) is formed to penetrate from the lower side to the upper side at the tip of the bladder center mechanism.

The structure of the link portion 3 will next be explained in detail. A rectangular-shaped link base 11 open on the left side is disposed at a tip of the boom 1. As shown in FIG. 2, between a ceiling 11a and a floor 11b of the link base 11, guide rods 12a and 12b extending in the vertical direction are respectively secured at suitable intervals in the ceiling 11a and the floor 11b. An opening 11c penetrates vertically through the ceiling 11a and the floor 11b.

A thick plate 13 is disposed on one edge of the tire grip body 9 on the side of the boom 1. As shown in FIG. 2, the center of this thick plate 13 has an internal thread 13a formed vertically. Circular passages 13b and 13c are formed in a vertical direction and complementary to the thread 13a. The guide rods 12a and 12b of the link base 11 are inserted to pass through the passages 13b and 13c by way of bushings 14a and 14b. An exterenal thread member 15 is screwably inserted into the internal thread 13a. The top and bottom of the external thread member 15 pass respectively through the openings 11c and 11c of the ceiling 11a and the floor 11b in the rectangular-shaped link base 11 and are supported by the nuts 16a and 16b to allow rotation. An angular piece 15a is provided at the bottom end of the external thread member 15. More specifically, the guide rods 12a and 12b and the passages 13b and 13c comprise two sets, and the external thread member 15 and internal thread 13a are arranged in the center of these two sets.

When loading (carry-in) or unloading (carry-out) with loaders or unloaders of the structure described above for gripping tires of different sizes for processing in the mold of the tire vulcanizer, it is advantageous to attach a handle to the angular piece 15a of the external thread member 15, and to rotate this handle. Screw feed occurs due to rotation of the external thread member 15 and the thick plate 13 rises and lowers together with the tire grip 2. The tire grip 2 rises or lowers smoothly along the guide rods 12a and 12b at this time. In this structure using the two guide rods 12a and 12b to guide the tire grip 2 relative to the boom 2, as compared with one guide rod type, the height is adjusted with little deviation from the center during movement in the vertical direction. Further, one external thread member 15 is positioned in the center of the two guide rods 12a and 12b so that the tire grip 2 is guided by the two guide rods 12a and 12b, resulting in little possibility of twisting in the tire grip body 9.

In this type of arrangement in which a screw structure is positioned near the center of the tire grip 2, smooth vertical movement of the tire grip 2 along the guide rods 12a and 12b is obtained, so that even if there is a slight error in screw feed, this error will be amplified in the center part of the tire grip 2 by only an extremely slight amount, and there will be no problems in maintaining precision when gripping and loading the untreated tire into the mold.

Further, during shaping, since the tip of the center mechanism of the bladder passes through the hole 9b of the tire grip body 9 and since a specified position can be easily set, the vulcanizing operation can be performed smoothly with no damage. This means that the problem of increased size due to the long-leg paddle grip structures needed to safeguard the shaping process in conventional loaders with a screw structure in the center of the tire grip can now be eliminated. In addition, since the screw feed for the unloader or loader of this embodiment can be performed by turning a handle, the size of the tire grip can be reduced as needed and the unit made more economical.

Figure 3:
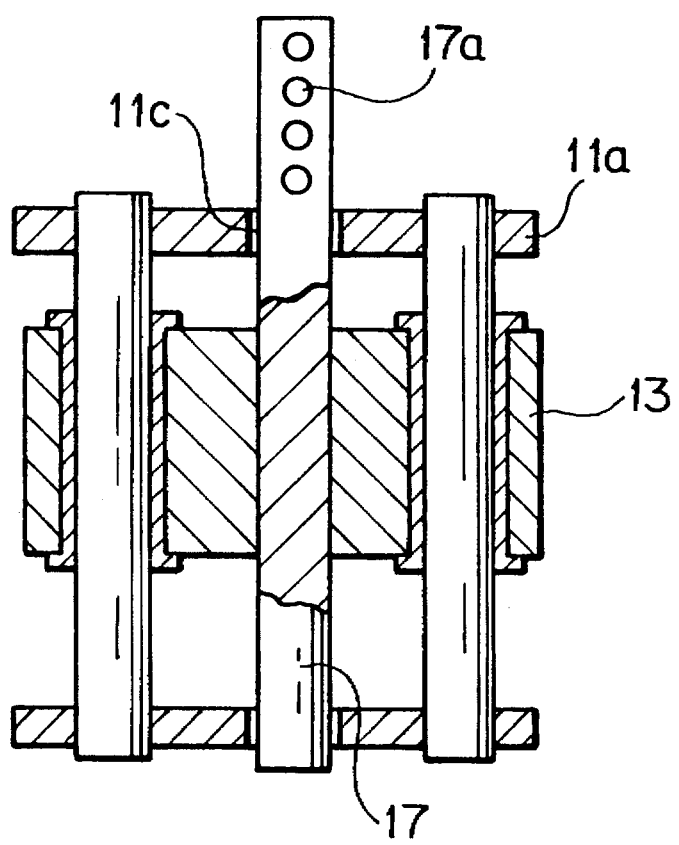
FIG. 3 is a conceptual descriptive view of a modified embodiment of a link portion of this invention.

In this embodiment, the height adjustment of the tire grip 2 was performed by a screw structure provided in the link portion 3. This height adjustment can be performed directly without using the screw structure. A variation of this embodiment, as shown in FIG. 3, has a stationary rod 17 penetrating the center of the thick plate 13 and protruding from the opening 11c of the ceiling 11a. By forming a plurality of pin holes 17a perpendicular to and at a suitable pitch relative to the protruding portion, a link portion is provided for adjusting the height of the tire grip 2 by changing the pin insertion position. This embodiment has the advantage that when the height of each untreated tire type is known, the height of the tire grip 2 can be quickly and easily adjusted by forming pin holes beforehand to match the height of each tire.

The above embodiment and the variation on the embodiment both show an example in which the link portion 3 is provided in the tip of the tire grip 2, however it is also possible to dispose it such that it passes through near the edge of the tire grip body 9 within a range that will not obstruct the movement of the grip paddles 9a. The closer the feed screw structure is to the center of the tire grip 2, the better the precision becomes.

What is claimed is:

1. A tire conveyor for a tire vulcanizer, the tire conveyor comprising:

a tire grip;

a boom having said tire grip at a tip of said boom, said boom being able to swivel freely and move up and down freely relative to a mold; and a link portion provided between said boom and said tire grip such that said link portion has a longitudinal axis which is parallel to and spaced from a swivel axis of said boom and a central axis of said tire grip, said link portion being capable of adjusting a position of said tire grip in a height direction.

2. A tire conveyor for a tire vulcanizer according to claim 1, wherein said link portion comprises:

a link base disposed at said tip of said boom;

a rotatable external thread member disposed in said link base; and an internal thread formed near a boom side end of said tire grip, said external thread member being screwed into said internal thread.

3. A tire conveyor for a tire vulcanizer according to claim 2, further comprising:

an immovable guide rod disposed in said link base; and a circular passage formed near said boom side end of said tire grip, said guide rod being inserted in said circular passage.

4. A tire conveyor for a tire vulcanizer according to claim 3, having two sets of said guide rod and said circular passage, said external thread member and said internal thread being disposed at the center of said two sets.

5. A tire conveyor for a tire vulcanizer according to claim 3, wherein one end of said external thread member has an angular piece, and a position of said tire grip is adjustable in a height direction by rotating said angular piece.

6. A tire conveyor for a tire vulcanizer according to claim 1, wherein said link portion comprises:

a link base disposed at said tip of said boom;

a rod having a plurality of pin holes and passing through a center portion of said link base; and a hole provided near an edge of a boom side of said tire grip, said rod being inserted in said hole.

7. A tire conveyor for a tire vulcanizer according to claim 1, wherein said link portion comprises:

a link base attached to the tip of said boom;

first and second guide rods on said link base;

a plate member attached to said tire grip and having first and second openings through which said first and second guide rods are respectively inserted such that said plate member is slidable along said first and second guide rods; and an adjusting means located on said link base between said first and second guide rods and passing through a third opening on said plate member, a control of said adjusting means permitting the adjusting of the position of the tire grip in the height direction.

8. A tire conveyor for a tire vulcanizer according to claim 7, wherein said adjusting means comprises a screw member having external threads which cooperate with internal threads in the third opening of the plate member, such that a rotation of the screw member changes a height position of the plate member and thereby permits the height direction adjustment of the tire grip.

9. A tire conveyor for a tire vulcanizer according to claim 7, wherein said adjusting means comprises a rod having a plurality of pin holes such that each pin hole corresponds to a different height of said tire grip.

* * * * *